United States Patent [19]

Gerstner

[11] 4,403,830
[45] Sep. 13, 1983

[54] INDICATING DEVICE

[75] Inventor: Dieter Gerstner, Heilbronn, Fed. Rep. of Germany

[73] Assignee: Licentia Patent-Verwaltungs-GmbH, Fed. Rep. of Germany

[21] Appl. No.: 170,992

[22] Filed: Jul. 18, 1980

[30] Foreign Application Priority Data

Jul. 27, 1979 [DE] Fed. Rep. of Germany ....... 2930507

[51] Int. Cl.³ .............................................. G02F 1/13
[52] U.S. Cl. ................ 350/331 R; 350/338; 350/345
[58] Field of Search ................ 350/338, 349, 331 R, 350/345

[56] References Cited

U.S. PATENT DOCUMENTS

| 3,736,047 | 5/1973 | Gelber et al. | |
|---|---|---|---|
| 3,832,034 | 8/1974 | Edmonds | |
| 3,833,287 | 9/1974 | Taylor et al. | 350/349 |
| 3,881,809 | 5/1975 | Fergason et al. | 350/338 |
| 3,905,682 | 9/1975 | Meyerhofer | 350/338 |
| 4,042,294 | 8/1977 | Billings, Jr. et al. | 350/338 X |
| 4,106,859 | 8/1978 | Doriguzzi et al. | 350/338 |
| 4,124,279 | 11/1978 | Byles | 350/345 |
| 4,126,383 | 11/1978 | Doriguzzi et al. | 350/345 X |
| 4,196,973 | 4/1980 | Hochstrate | 350/345 X |
| 4,227,777 | 10/1980 | Murakami | 350/334 |
| 4,355,868 | 10/1982 | Perregaux et al. | 350/345 X |

FOREIGN PATENT DOCUMENTS 2709731 8/1978 Fed. Rep. of Germany ...... 350/338

OTHER PUBLICATIONS

Berman, A. et al., "What can the Automobile Industry Expect from Liquid Crystal Displays?" *Society of Automotive Engineers*, (Congress of Feb. 26-Mar. 2, 1979).
"New Approach to Vehicle Instrumentation" in *Engineering*, (Oct. 1975), vol. 215, No. 10, pp. 819-821.

Primary Examiner—John K. Corbin
Assistant Examiner—Richard F. Gallivan
Attorney, Agent, or Firm—McGlew and Tuttle

[57] ABSTRACT

An indicating device has a first surface area having variable optical properties and a second surface area having fixed optical properties. The optical properties of the first and second surface areas are coordinated to provide improved readability and perceptibility of the indications on the indicating device.

4 Claims, 5 Drawing Figures

INDICATING DEVICE

FIELD AND BACKGROUND OF THE INVENTION

The invention relates in general, to an indicating device and, more particularly, to an indicating arrangement in which one surface area has variable optical properties and another surface area thereof has fixed optical properties.

In electronic devices and electronically controlled machines, there is a growing need for electronic indicators which permit communication between man and machine.

The indicators are used to provide information on operating conditions, the results of computation, errors and the like. Typical applications include computers and copiers, and in the future will be used for example, in motor vehicles or automatic washing machines with an electronic control.

Very frequently numerical displays are required for this purpose and, at a growing rate, other display formats such as electronic "pointers" in the form of straight or arcuate linear scales, as well as, certain symbol formats are needed. To enable even unskilled users to read the indications easily and correctly, further optical characters, standard marks, and fixed numbers are frequently printed on the indicating unit as fixed, unchangeable information.

The term multifunction indication has become typically applied to such a combination of different indication formats on a single display panel.

SUMMARY OF THE INVENTION

The invention is directed to the problem of improving the readability and perceptibility of such indications even under very strongly varying conditions of illumination.

In accordance with the invention, an indicating device is provided which includes a first surface area having variable optical properties, means for electronically varying an optical property of the first surface area between an inactive condition and an activated condition, and a second surface area having fixed optical properties including a first surface portion defining a bright area and a second surface portion defining a dark area, the dark area having an absorptivity of less than 100% and the bright area having a reflectance of less than 100% the dark areas also having a residual reflectance. The readability and perceptibility of the indications is improved and enhanced, in accordance with the invention, by providing specifically defined interrelationships between the optical properties of the first surface area and the second surface area. In accordance with a preferred embodiment of the invention, the first surface area comprises liquid crystal cells.

It is an object of the invention to provide an indicating device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
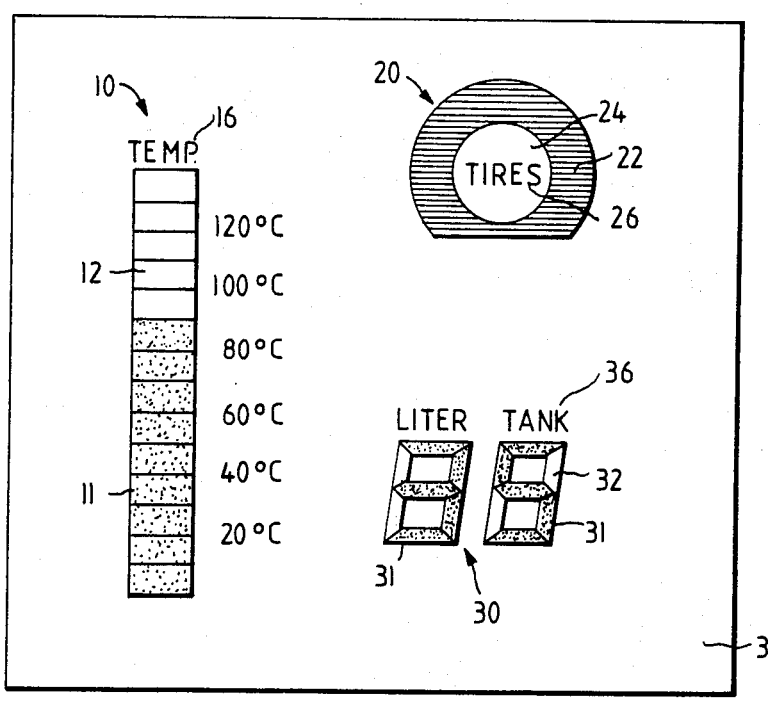
FIG. 1 illustrates a display panel of an indicating device according to the invention.

FIG. 1 shows the display panel of an indicating device for providing information, for example, to a driver of a motor vehicle on the operating conditions of the vehicle. The indicating device comprises a first indication area 10 communicating, for example, information relative to the temperature of the cooling water, a second indication area 20 for providing an indication of the condition of tires and a third indication area 30 for the fuel quantity in the tank. Within each of the indication areas 10, 20, 30 there is provided a first portion or kind of areas having optical properties, for example, light transmittance or reflectance which can be changed or activated by electronic means, and a second portion or kind of areas having optical properties which cannot be changed by electronic means and which include bright and dark and/or also colored areas.

The portions of indication areas 10, 20, 30 which are not capable of being electronically activated, comprise, for example, the optical character indications Temp, Tires, Liter Tank. The area indicating the cooling water temperature contains optical character graduation indications as well. These electronically non-activatable or fixed areas of the display panel are advantageously designed so that, for example, the line of characters 26 in area 20 appears dark on a bright central portion 24, while the character lines 16 and 36, respectively in areas 10 and 30, and the graduations in area 10, appear bright on a dark background 3.

Indication areas 10, 20, 30 also include portions or areas having optical properties which can be varied electronically. For example, area 10 includes a display bar comprising segments 11. One part of the segments 11 may be activated, as shown, by electronic means to indicate a cooling water temperature of 90° C. while the other segments 12 of the bar, above the 90° C. graduation are not activated.

In indication area 20, the central portion 24 is bright in itself and includes the dark indication in characters 26, is surrounded by a substantially annular area 22 which may be activated by electronic means.

The indication area 30, aside from the fixed line of optical characters 36, includes a two-digit display of electronically activatable segments is provided. In the shown example, some of the segments 31 are activated, while segments 32 are not activated, so that the numeral thirty-five is displayed.

The non-activatable dark areas, for example, of the area 30 or the line characters 26 is not designed for 100% absorptivity and, thus, is not a black body. The bright areas of the display panel, for example, the lines of characters 16,36 and the temperature scale in area 10, are not designed to be pure white, that is, to radiate very strong diffuse reflection.

To further improve the visual perception, it is advisable to make the residual reflection of the dark areas of the display panel which cannot be varied or activated, for example, the line of characters 26 in indication area 20, equal to a residual reflection of the non-activated areas, for example, the non-activated segments 12 in indication area 10 and the non-activated annular area 22 in indication area 20 or the non-activated segments 32 of the numerical display indication area 30.

Also, a reflection color of the dark areas, thus of those areas specified above, should equal the residual reflection or reflectance color of the non-activated areas of the display panel.

Figure 2:
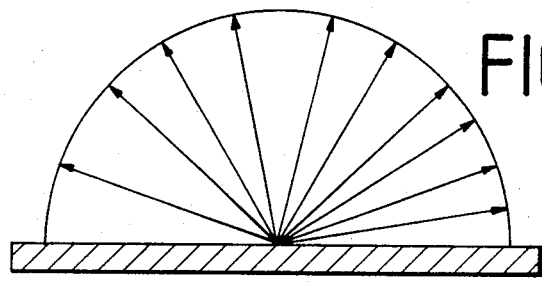
FIG. 2 is a diagrammatic representation illustrating the reflection characteristic of a white surface perfectly diffusing incident light.
Figure 3:
FIG. 3 is a diagrammatic representation, similar to FIG. 1, showing the reflection characteristic of a dark surface perfectly diffusing incident light.

Particularly satisfactory conditions of visual perception are obtained if the residual reflection of the dark areas of the panel is approximately equal to three percent of the reflection on an ideal white body diffuser. The reflection characteristic of such a perfectly white diffuser is diagrammatically shown in FIG. 2, by way of example, for a single plane of a semi-infinite space. The length of the arrows corresponds to the luminous density or brightness measured at definite distance from the reflecting surface. In such a case, the luminous densities are identical at all points of semi-infinite space at locations equally spaced from the reflecting surface.

The residual reflection or reflectance of the bright areas of the display panel, for example, the lines of characters 16,36, the graduation in area 10, and the central area 24 in indication area 20, is advantageously made equal to the reflection of the activated areas of the display panel, for example, of activated segments 11 in indication area 10 and of activated segments 31 in indication area 30.

To obtain particularly satisfactory conditions of visual perception the reflection of the above specified bright areas of the display panel is made equal to approximately forty percent of the reflection of a perfectly white diffuser and, further, the color of the bright areas of the display panel is made equal to the reflection color of the activated areas of the display panel.

The readability of the display is further improved if the angle characteristic of reflection of the bright and dark areas has a certain preferential direction, thus is not purely diffusive. Such a desired angle characteristic or reflection of the bright and dark areas of the display panel may advantageously be obtained, for example, by reflecting metal or glass particles on the respective surface areas of the display sectors or the display panel.

Figure 4:
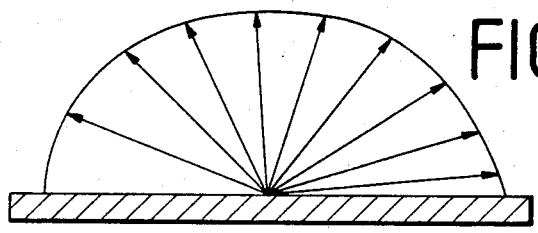
FIG. 4 is a diagrammatic representation similar to FIG. 2, showing the reflection characteristic of a surface area of the indicating device which has been activated, having optical properties altered by electronic means.
Figure 5:
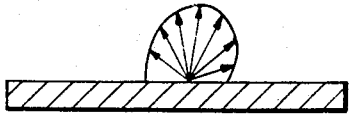
FIG. 5 is a similar diagram showing the reflection characteristic of a non-activated surface area of the indicating device.

The reflection characteristic of an activated area of the display panel is diagrammatically illustrated in FIG. 4, and a similar characteristic of an non-activated area is shown in FIG. 5. Again, the length of the arrows corresponds to the respective brightness.

In some applications, it is advisable to design the display panel with an illumination from the rear. In such an embodiment of the invention, both the bright and the dark portions of the entire display panel of the indicating device must be made translucent for the light transmission from the rear. In this case, particularly satisfactory conditions of visual perception are obtained if in the dark areas of the display panel, the degree of transmission of the light from the rear corresponds to the residual reflection of the non-activated areas of the display panel, and if in the bright areas of the display panel, the degree of transmission of the rear light is equal to the reflection of the activated areas of the display panel. It is particularly advantageous in this connection, if the angle characteristic of the rear light transmitted through the bright zones of the display panel is equal to the angle characteristic of the activated areas, and if the angle characteristic of the rear light transmitted through the dark zones is equal to the angle characteristic of the non-activated areas of the display panel. To this end, advantageously a translucent surface with metallic reflection is provided beneath the bright or the dark areas, or both, of the display panel. Further, at least in the dark or colored areas of the display panel, the color-imparting pigments are applied in a fine dot or bar pattern in such a way that metallic reflecting and more or less absorbing surface elements alternate with each other within each of the areas. Further the metallic reflecting layer may also be provided in such a pattern that relatively highly transmitting areas alternate with areas of high reflection in a regular array.

The electronically activatable areas of the display panel are advantageously designed as liquid crystal cells, which are known and operate on the principle of dynamic scattering.

While specific embodiments of the invention have been shown and described in detail to illustrate the application of the principles of the invention, it will be understood that the invention may be embodied otherwise without departing from such principles.

What is claimed is:
1. An indicating device comprising:
a first surface area having variable optical properties;
means for electronically varying an optical property of said first surface area between an inactive condition and an activated condition;
a second surface area having fixed optical properties including a first surface portion defining a bright area and a second surface portion defining a dark area, the dark area having an absorptivity of less than one hundred percent and the bright area having a reflectance of less than one hundred percent; and
means for transmitting light incident to said bright area and said dark area from a rear side of said second surface area;
said bright area having a first angle characteristic of light penetrating through the bright area from the rear side thereof, said first surface area having an active angle characteristic in its active condition equal to the first angle characteristic;
said dark area having a second angle characteristic of the light penetrating through the dark area from the rear side thereof, and said first surface area having an inactive angle characteristic in its inactive condition equal to said second angle characteristic;
said dark area having a first reflectance, the first surface area having a second reflectance in its inactive condition, and the first reflectance equaling the second reflectance; and
said dark area also having a first degree of transmission for a light incident from the rear side corresponding to said second reflectance, said bright area having a second degree of transmission for the light incident from the rear side, and said first surface area having a transmission in its active condition equal to said second degree of transmission.

2. The indicating device according to claim 1 wherein said dark area has a dark reflection, the first surface area has an inactive reflectance color in its inactive condition, and the dark reflection color is the same as the inactive reflectance color.

3. The indicating device according to claim 1 wherein said first reflectance amounts to about three percent of the reflection of an ideal white diffuser.

4. The indicating device according to claim 1 wherein said bright area has a bright reflection color, said first surface area has an active reflection color and the bright reflection color equal the active reflection color.

* * * * *